UNITED STATES PATENT OFFICE.

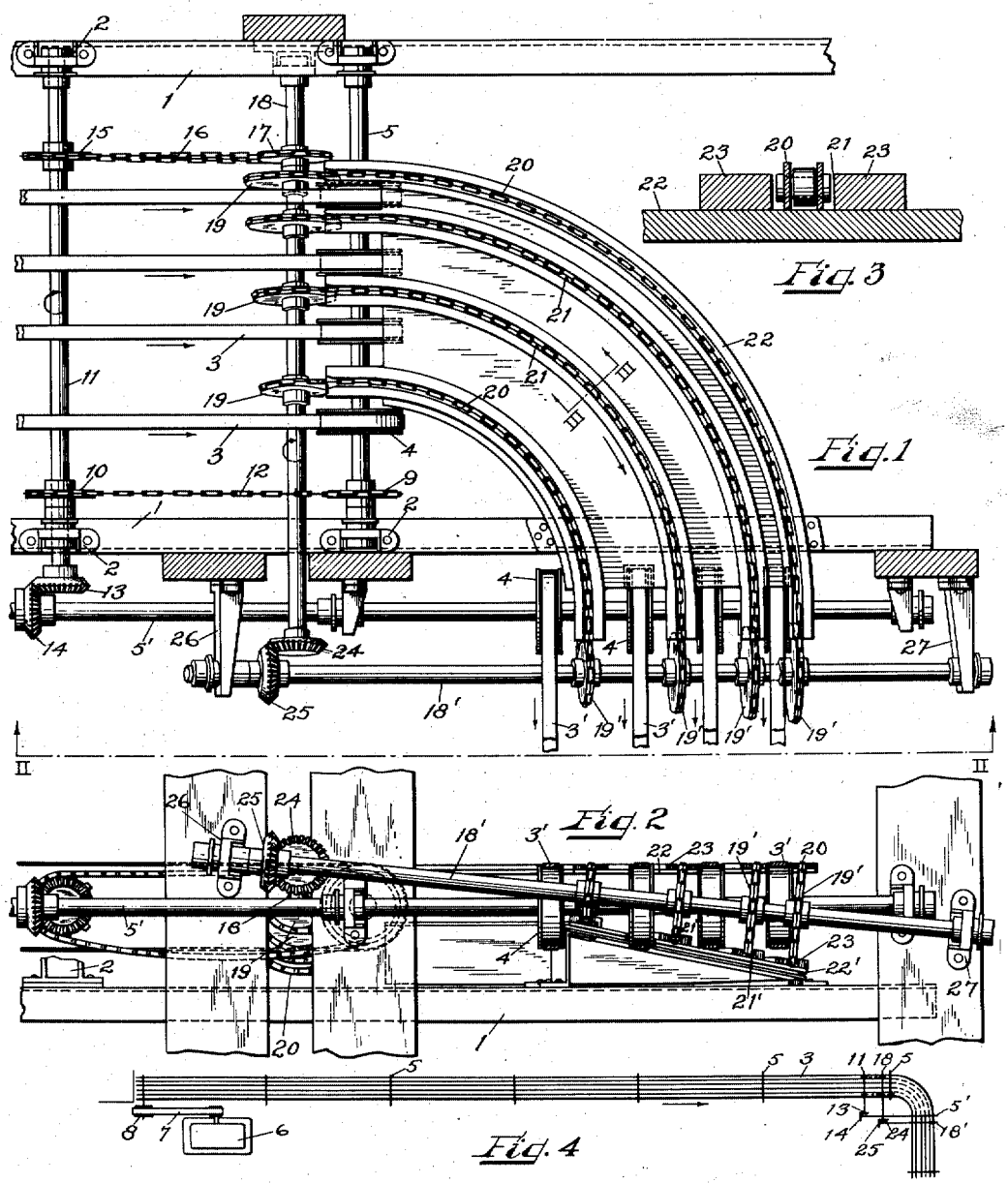

JAMES T. COWLEY, OF MINOT, MASSACHUSETTS, ASSIGNOR TO THE LAMSON COMPANY, OF BOSTON, MASSACHUSETTS, A CORPORATION OF NEW JERSEY.

CORNER FOR CONVEYERS.

1,206,305.  Specification of Letters Patent.  Patented Nov. 28, 1916.

Application filed March 22, 1915. Serial No. 16,038.

*To all whom it may concern:*

Be it known that I, JAMES T. COWLEY, a citizen of the United States, residing at Minot, in the county of Plymouth and State of Massachusetts, have invented certain new and useful Improvements in Corners for Conveyers, of which the following is a specification.

This invention relates to conveyers for newspapers and the like and has for one of its objects the provision of a simple corner for carrying articles such as newspapers, in an endless train from one horizontal belt to another.

Another object of the present invention is to subject the newspapers, when being carried through for example a 90° bend, to as little friction as possible, either with each other or with the parts which cause movement of same; whereby to prevent smearing of the fresh ink or coloring matter upon the papers.

These and other objects of my invention will be hereinafter set forth and the novel combinations of elements whereby said objects may be attained will be more particularly pointed out in the claims appended hereto.

In the drawing which forms a part hereof and in which like reference characters designate like parts throughout the several views, I have exemplified a preferred construction; but as I am aware of various changes and modifications which may be made herein, without departing from the spirit of my invention, I desire to be limited only by the scope of said claims.

Referring to the drawing, Figure 1 is a plan view of an improved newspaper conveyer corner. Fig. 2 is a section of the same taken on line II—II. Fig. 3 is a detailed section taken on line III—III of Fig. 1; and Fig. 4 is a diagrammatic plan view of the entire conveyer.

As shown in Figs. 1 and 2, side-supports or angle-irons 1 may be used as a frame for the conveyer; suitable bearings 2 being secured to these side-supports, to provide journals for the shafting.

The conveyer may be of the belt type and may comprise a plurality of narrow belts 3, mounted upon pulleys 4, in a known manner, carried by shafts 5. These belts 3 may be driven by a motor 6, through the instrumentality of a belt 7 and pulley 8, as diagrammatically indicated in Fig. 4.

Power may be transmitted from one set of belts 3, at the corner, to the adjacent belts 3', running at right angles to those first mentioned, by providing a sprocket wheel 9, upon the shaft 5, nearest the corner, and connecting this sprocket wheel by means of a chain 12 with a second sprocket wheel 10 mounted upon a counter-shaft 11. This shaft 11 may carry at the extremity thereof which lies nearest the belts 3', to which power is to be transmitted, a bevel gear 13 which may be meshed with a corresponding gear 14 mounted upon a shaft 5' which carries pulleys 4, around which pass the belts 3'. The shaft 11 also carries a second sprocket wheel 15, and a chain 16 connects this latter with a sprocket wheel 17, upon a preferably obliquely disposed shaft 18. This shaft is thus obliquely disposed or placed at an angle to the horizontal plane in which ride the upper surfaces of the belts 3, for reasons hereinafter indicated. Upon the shaft 18 are a series of sprocket wheels 19, which are preferably made of successively smaller diameters as the shaft 5' is approached. Chains 20 extend around these sprocket wheels 19 and have the jointures of the respective links thereof so formed as to permit of a certain amount of lateral play whereby to allow these chains to travel through the arcuate grooves 21 in the upper surface of the corner plate or frame 22.

The grooves 21 may be formed in any suitable manner, as for example by fastening to the upper surface of the plate 22 arcuately bent strips 23, made of suitable material adapted to withstand the constant rubbing of the chains 20 thereagainst.

The shaft 18 carries upon its lower extremity, as viewed in Fig. 1, but which extremity is in reality the upcanted end of said shaft, a beveled gear 24 which is in mesh with a similar gear 25, mounted upon a similarly obliquely disposed shaft 18'. The end of the shaft 18' which carries the beveled gear 25 is, as in the case of the shaft 18, the upcanted or uppermost end of said shaft 18', since the latter inclines downwardly from the bracket 26, in which this end is journaled, toward the bracket 27 at the other extremity thereof.

A set of sprocket wheels 19', corresponding in their graduated diameters to those mounted upon shaft 18, are positioned upon the shaft 18', and the chains 20 after they emerge from their grooves 21 pass around this second set of sprockets and extend thence back through corresponding grooves 21' in a lower and obliquely disposed or canted plate 22', back to the first set of sprocket wheels 19.

As the several chains 20 travel in grooves 21 which are concentric, it is obvious that the outermost chain 20 should travel at a higher rate of speed than does the chain 20 adjacent thereto but inwardly thereof. Correspondingly, each successive chain 20, as the common center of the arcs is approached, must travel less rapidly when the chain therebeyond, which travels through the arc of a circle of larger diameter. It is for this reason that the sprocket wheels 19—19' are graduated in size, and it is for this reason also and, further, because of the desirability of delivering a given chain 20 from its groove 21 or 21' directly and without any material change of its direction of movement from the horizontal plane, to the corresponding sprocket 19 or 19' and vice versa, that the shafts 18 and 18' are canted or inclined in the manner shown.

The operation of the mechanism is as follows: The motor 6 is driven to cause the belts 3 to travel in the direction of the arrows adjacent thereto and newspapers or the like which may be placed upon these belts will be carried toward the corner. The belts 3 will of course drive the shaft 5 immediately adjacent to the corner, and this shaft in turn, will, through the intermediacy of the several chains and bevel gears, drive the shafts 11, 5', 18 and 18'. The pulleys 4 upon the shaft 5' will thus be caused to drive the belts 3' in the direction indicated, and the chains 20 will be driven so as to receive the newspapers or other articles from the belts 3 and to carry these articles smoothly and evenly around the corner and emplace them upon the belts 3'.

No pressure is exerted upon the papers while they are thus caused to traverse the corner, so that there is little tendency for them to smear, if the ink be fresh, when they spread apart and thereafter fold together, slightly, after the fashion of a fan. Furthermore, there is little tendency for the chains 20 to slip along beneath the papers, owing to the extended engagement of the latter with these chains; and hence there is but little likelihood of the ink upon the bottom-most papers being smeared as is apt to happen when a series of independently driven rollers are caused to successively engage an article to be translated around a corner.

While I prefer to use chains as a medium for thus carrying articles around a corner, it is obvious that various devices might be employed in lieu thereof, and I have hence broadly defined these chains, in certain of the appended claims, as flexible elements. The fact, however, that the respective parts of these flexible elements are capable of being swiveled or turned with respect to each other, in practically all directions, coupled with the fact that means are provided to co-act with these elements and take advantage of the exceeding flexibility thereof, effects, it is believed, a combination which is broadly new.

The provision of a series, or rather two series, of graduated members, such as the sprocket wheels 19 and 19', whereby to drive these flexible elements at speeds so proportioned as to result in the least possible disarrangement of the chain of newspapers or the like, is also believed to be of considerable importance.

In general, so far as I am aware, no one has heretofore attempted to provide co-acting endless flexible elements which by their movement effect a translation of articles to be conveyed around a curve lying in a given plane, by driving these elements through the intermediacy of, for example, sprocket wheels so that the portions of the chains or flexible elements which are in engagement with said wheels follow arcuate courses in planes which are angularly disposed with respect to the given plane aforesaid.

Having thus described my invention, what I claim is:

1. A corner for conveyers comprising a corner piece having grooves therein the opposed sides of each of which grooves are concentrically arcuate, rotatable members upon substantially opposite sides of said corner piece, flexible elements in engagement with said grooves and guided thereby in lines which are at variance with those which said rotatable members would normally cause said elements to travel in, in the absence of such guiding provisions, and means to drive said rotatable members and flexible elements.

2. The combination of two conveyers traveling in lines at variance to each other, with corner forming means to connect said conveyers and deliver material from one to the other, said means comprising a plurality of independently movable endless flexible elements, spaced rotatable members upon which said elements rise, said members having a tendency to cause the portions of said elements lying therebetween to move in determined paths, guiding means acting independently on each of said flexible elements to laterally flex said portions and to compel them to travel in paths different from said determined paths, said different paths being concentrically curved and at the extremities thereof, being substantially in alinement with the respective conveyers, said guiding means being out of the way of articles being carried by said flexible elements and maintaining the load carrying portions of adjacent elements equi-distant from each other at substantially all times.

3. In mechanism for conveying articles around a curve lying in a determined plane, the combination of a plurality of separate endless flexible elements to directly support said articles, the article-carrying parts of said flexible elements moving in concentric curves in said plane to effect translation of said articles around said curve while maintaining the points of contact between said parts and the articles supported thereby substantially fixed, fixedly located means to separately engage and laterally guide portions of said elements for movement through their respective curved courses in said plane, means to guide other portions of said elements for movement through arcuate courses in planes angularly disposed with respect to that aforesaid, and driving means for said mechanism.

4. In mechanism for conveying articles around a curve lying in a determined plane, the combination of an endless flexible element which by its movement in said plane effects a translation of said articles around said curve, a grooved support below said plane and parallel thereto for holding the article moving portion of said flexible element in said plane, said support having an arcuate groove therein which opens upwardly toward said plane to present the curved lateral walls of said groove to the respective sides of said element to definitely locate the latter, means to guide other portions of said element for movement through arcuate courses in planes which are angularly disposed with respect to that aforesaid, and means to drive said mechanism.

5. In mechanism for conveying articles around a curve lying in a determined plane, the combination of a plurality of co-acting endless flexible elements which by concentrically curvilinear movements thereof in said plane effect a translation of said articles around said curve, tapering rolls at the ends of said curve around which said endless elements pass respectively for forward movement in the direction in which said articles travel and for return, grooved means to individually support and separately guide each of said elements, independently of any other, for travel curvilinearly in both said forward and return movements, the forward traveling portions of said flexible elements projecting up above said grooved means where in contact therewith, and means to drive said mechanism.

In testimony whereof I have affixed my signature in the presence of two witnesses.

JAMES T. COWLEY.

Witnesses:
ETHEL M. JORDAN,
DAISY L. BENNETT.

It is hereby certified that in Letters Patent No. 1,206,305, granted November 28, 1916, upon the application of James T. Cowley, of Minot, Massachusetts, for an improvement in "Corners for Conveyers," an error appears in the printed specification requiring correction as follows: Page 2, line 123, claim 2, for the word "rise" read *rile;* and that the said Letters Patent should be read with this correction therein that the same may conform to the record of the case in the Patent Office.

Signed and sealed this 19th day of December, A. D., 1916.

[SEAL.]

R. F. WHITEHEAD,
*Acting Commissioner of Patents.*